Figure 1:
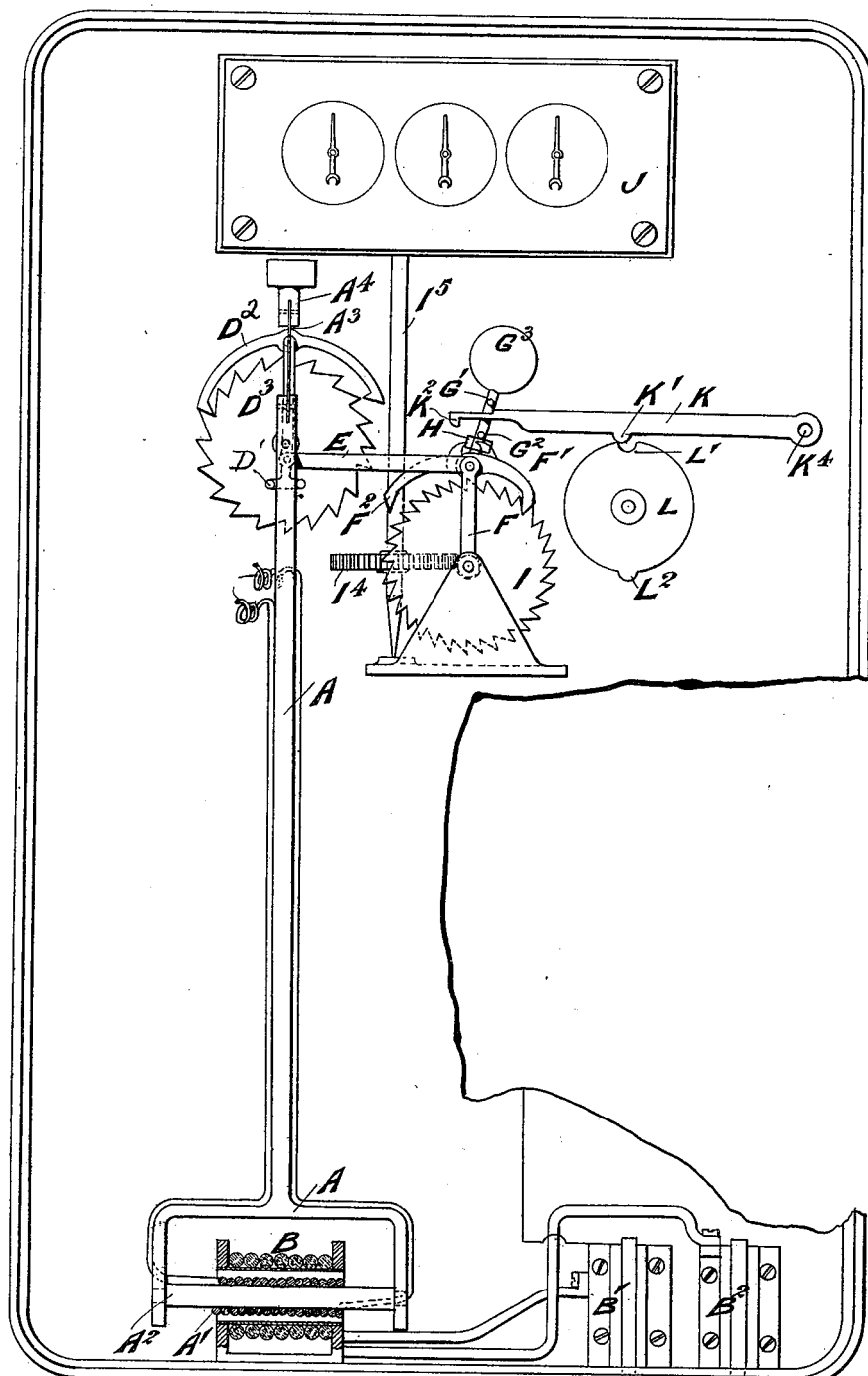

No. 644,552. Patented Feb. 27, 1900.
G. HOOKHAM.
ELECTRIC METER.
(Application filed Sept. 12, 1899.)

(No Model.) 4 Sheets—Sheet 1.

WITNESSES:
INVENTOR
George Hookham
BY
ATTORNEYS

No. 644,552. Patented Feb. 27, 1900.
G. HOOKHAM.
ELECTRIC METER.
(Application filed Sept. 12, 1899.)
(No Model.) 4 Sheets—Sheet 3.

WITNESSES:
Ella L. Giles

INVENTOR
George Hookham
BY
Richardson
ATTORNEYS

No. 644,552. Patented Feb. 27, 1900.
G. HOOKHAM.
ELECTRIC METER.
(Application filed Sept. 12, 1899.)

(No Model.) 4 Sheets—Sheet 4.

WITNESSES:
Ella L. Giles

INVENTOR
George Hookham
BY
Richardson
ATTORNEYS

UNITED STATES PATENT OFFICE.

GEORGE HOOKHAM, OF BIRMINGHAM, ENGLAND.

ELECTRIC METER.

SPECIFICATION forming part of Letters Patent No. 644,552, dated February 27, 1900.

Application filed September 12, 1899. Serial No. 730,206. (No model.)

*To all whom it may concern:*

Be it known that I, GEORGE HOOKHAM, a subject of the Queen of Great Britain and Ireland, and a resident of 7 and 8 New Bartholomew street, in the city of Birmingham, England, have invented certain new and useful Improvements in Electric Meters, (for which I have made application for Letters Patent in Great Britain, No. 21,633, bearing date October 14, 1898,) of which the following is a specification.

My improvements apply to that class of meters in which the acceleration or retardation of a pendulum the bob of which is attracted or repelled by a coil carrying the current to be metered as compared with another pendulum beating regularly is registered by a counter and dials. The acceleration or retardation being within limits proportional to the current, (or energy, as the case may be,) the apparatus registers the current (or energy) supplied through the meter in a given time. In such a meter absolute synchronism of the two pendulums when no current is passing is generally a necessary condition, and it is a condition which it is very difficult to fulfil. By my invention I use only one pendulum. In one form this pendulum drives a ratchet-wheel the pawl of which is reversed at equal intervals of time—say every five minutes—so that for one five minutes the ratchet is driven forward, the next five minutes it is driven backward, and therefore normally at the end of each ten minutes the effect on the counter is *nil;* but if I cause the pendulum-bob to be attracted by a coil-carrying current during the first five minutes and not to be so attracted during the second five minutes then the result of the acceleration during the first five minutes is registered by the counter. This I may effect by attaching to the bob a coil carrying a shunt-current in a manner well understood and alternately making and breaking this current at the end of each five minutes, or I may reverse the shunt-current at each interval of time, in which case the difference between the effects of acceleration and retardation will be registered. In the former case it is evident the energy is "sampled" every five minutes. In the latter the registration is continuous.

Figure 2:
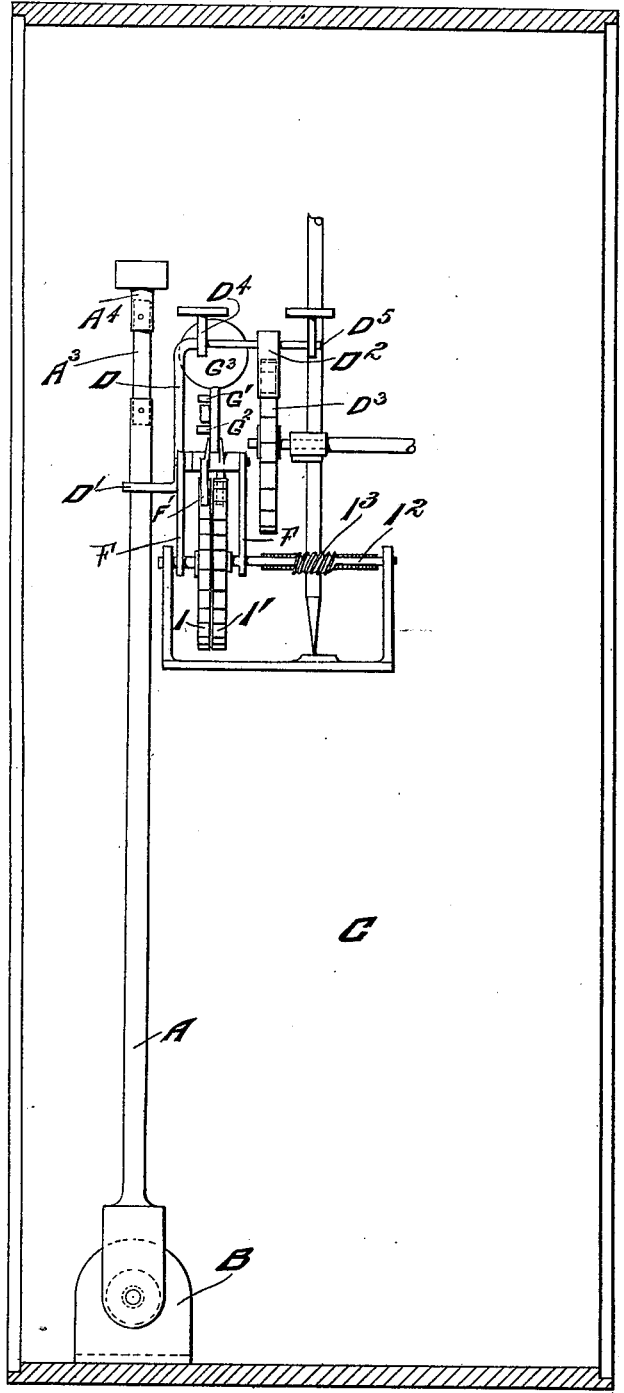
Figure 3:
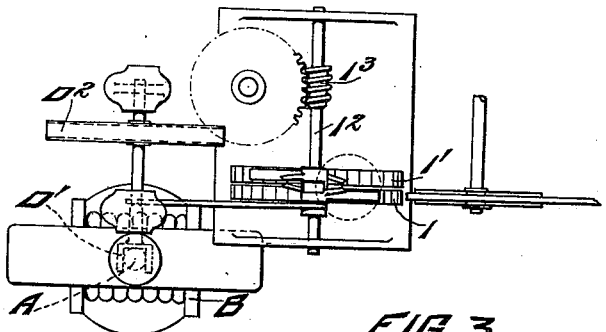
Figure 7:
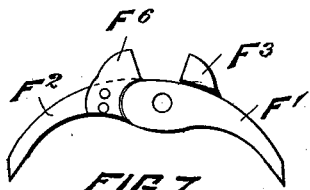
Figure 6:
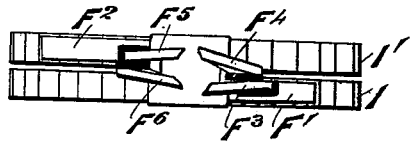
Figure 5:
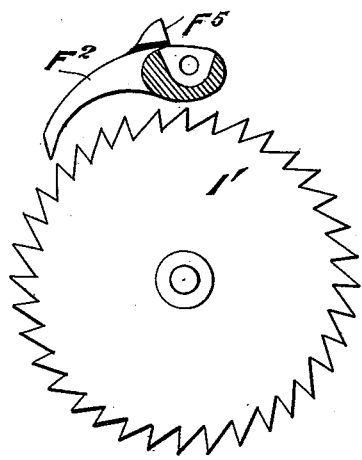
Figure 9:
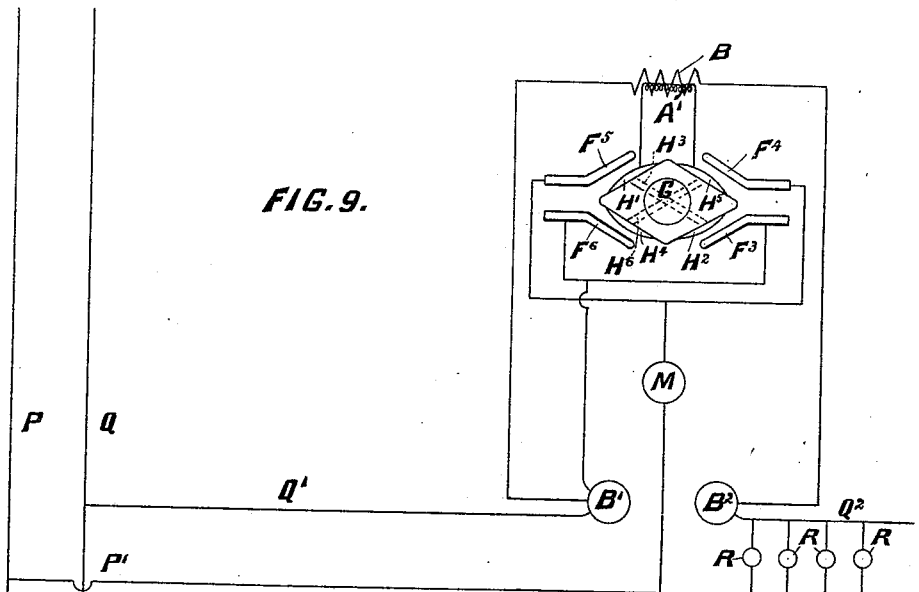
Figure 8:
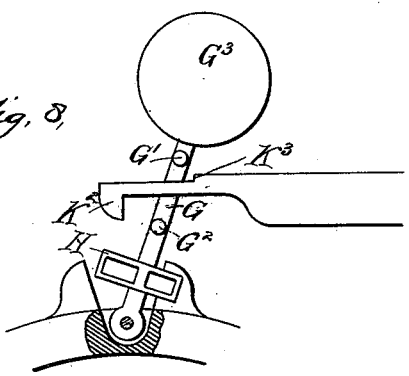

Referring to the accompanying sheets of drawings, Figure 1 is a front elevation, Fig. 2 a side elevation, and Fig. 3 a plan, of my new pendulum-meter. Figs. 4, 5, 6, 7, and 8 show views of details of the same, and Fig. 9 shows a diagram of the complete device.

In carrying my invention into effect according to one modification, as illustrated in the drawings, A is a pendulum of any suitable type, carrying a shunt-coil A'. The wires from the ends of the coil A' are led up the pendulum to a point where there is but a small motion of the pendulum relatively to the case C of the instrument, and there the wires are connected by fine spirals to suitable contact-pieces on the tumbler G. (See Fig. 9.) A double pawl F' F², acting in the manner hereinafter described upon the wheels I and I' and controlled by the tumbler G, carries four contact-terminals F³, F⁴, F⁵, and F⁶, as clearly shown in Figs. 5, 6, and 7 and diagrammatically in Fig. 9. The terminals F⁴ and F⁵ are connected to a wire passing to the independent shunt-terminal M, while the terminals F³ F⁶ are connected to the main terminal B'. The electrical connections must be such that no friction is caused which would interfere with the motion of the pendulum. A series coil B is provided, connected with the series terminals B' B², which coil surrounds the moving shunt-coil A', but in such manner as to leave the latter free to vibrate within it. The pendulum A is suspended by a thin flat spring A³ in a usual manner from the fixed point A⁴. A lever D, pivoted at D⁴ and D⁵, has a forked end D', which engages with the pendulum, and to this lever D is fixed the escapement-lever D². The escapement-wheel D³ is supported and driven from a spring or other clock device in any usual manner. Fixed on another shaft I², I provide two ratchet-wheels I and I', having their teeth formed for driving in opposite directions. The pawl F' F² has two branches, one of which, F', drives the ratchet-wheel I and the other, F², drives the ratchet I', so that a change from driving by one pawl to driving by the other involves reversal of the whole or part of the recording-train. The compound pawl F' F² is operated by a link E from the lever D and is supported on a pivot on the end of a double lever F, pivoted on the axes of the ratchet-wheels. The pawl which is in action at any time is determined by a tumbling-lever G, more fully described below, and the lever G is operated to simultaneously reverse both the operating-pawl and the direction of the current flow through the moving coil A'. The lever G is tumbled over and reversal effected by means of a lever K, pivoted at $K^4$ to any stationary point and supported on a disk cam L in such a manner that when its projection K' drops into the notch L' of the disk L the projection $K^2$ on the lever K catches the pin $G^2$ on the tumbler G as the tumbler and pawl reciprocate and causes the tumbler to fall over to the right, reversing the electrical connections at H (see Fig. 9) and putting the pawl F' into operation on the wheel I. Similarly when the projection $L^2$ of the cam L acts on the lever projection K' the projection $K^3$ catches the pin G', tumbling over the lever G and reversing the electrical connections again. On the shaft $I^2$ of the ratchet-wheels I I' there is provided a worm $I^3$, (see Fig. 2,) gearing with a worm-wheel $I^4$ on the shaft $I^5$ of an ordinary recording-train J. The disk cam L is driven from an ordinary spring-clock of cheap construction or some other roughly-correct type of clock. Accurate timekeeping by such a clock is not necessary. All that is required is that its rate (whatever it be) shall be constant or approximately constant in successive intervals. The cam L then, as illustrated, makes half a revolution before it reverses the tumbler G, with its switch H and pawls F' $F^2$.

The cam L may be operated from any suitable periodic operating device instead of from a clock.

Figure 4:
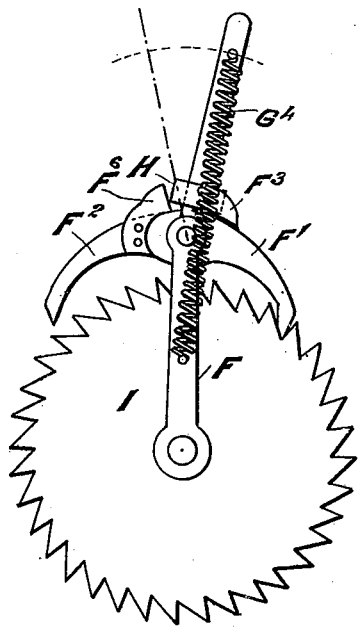

In Figs. 4, 5, 6, 7, and 8 the ratchet-wheels I and I', with the pawl F' $F^2$, are shown enlarged. Fig. 4 shows also a modified form of tumbler, in which the inertia of the weight $G^3$ cannot give trouble, as it is replaced by a spring $G^4$. A block of insulating material H (shown in detail in Fig. 9) is attached to the tumbler G and serves as part of the electric reversing-switch. In Fig. 9 also the internal shunt connections of the meter are shown diagrammatically. The contact-pieces $F^3$, $F^4$, $F^5$, and $F^6$ are attached to, but are insulated from, the pawl F' $F^2$. $F^3$ and $F^6$ are connected together and then to the negative side of the supply-main. Contact-pieces $F^4$ and $F^5$ similarly are connected to one another and to the positive lead. On the four faces of the insulating-block H (see Fig. 9) are placed contact-pieces H', $H^2$, $H^4$, and $H^5$. The contact-pieces H' and $H^2$ are connected by the wire $H^3$, and the pieces $H^4$ and $H^5$ are similarly connected by the wire $H^6$. From H' and $H^5$ wires pass by means of fine spirals, as is commonly done in electric meters, to the ends of the coil A', which here represents the coil A' in Figs. 1 and 2, these wire connections from the pieces H' and $H^5$ to the coil A' being shown diagrammatically in Fig. 9, but being omitted from Figs. 1, 2, and 3 to prevent confusion of lines in said figures. If now the tumbler be lying to the right in Fig. 1, then contact is made from the positive shunt-wire of the meter to $F^4$, thence to contact-piece $H^5$ through the coil A', and back through contact-pieces H', $H^2$ and $F^3$ to the negative lead of the meter. Similarly, if the tumbler be lying on the other side—i. e., to the left in Fig. 1—then current will be sent through the coil A' in the opposite direction. The passage of the current will be clearly seen from Fig. 9, which shows diagrammatically the complete arrangement of connections. P and Q represent the electricity-supply mains. From the main P the current passes by the lead P' through the lamps or other load R, thence by the lead $Q^2$ to the terminal $B^2$ of the meter, through the series coil B to the terminal B', and then through the lead Q' to the main Q. In the shunt-circuit the current passes from the lead P' to the shunt-terminal M, from there through the shunt-coil A' to the terminal B', and thence to the main Q by the lead Q'. This shunt-current passes through the coil A' in either direction, as controlled by the position of the tumbler G. In one position the current passes from M to the terminal $F^4$ and contact-piece $H^5$, then through coil A' by contact-piece H', wire $H^3$, and contact-piece $H^2$ to terminal $F^3$, and thence to the meter-terminal B'. In the other position the current passes from M to the terminal $F^5$ and contact-piece H', then through coil A' in the reverse direction by the contact-piece $H^5$, wire $H^6$, contact-piece $H^4$ to the terminal $F^6$, and thence to the meter-terminal B'.

I will now briefly describe one method of operation of the above meter.

Assume that the pendulum A is to be accelerated during one period of, say, five minutes and retarded during the next. Then the series current, which is always passing in the coil B, acts on the pendulum-coil in one direction, causing acceleration proportional to the current during the first period, which is recorded by means of the pawl $F^2$ driving the index-train. At the end of this period the cam K' drops into the notch L', as the disk L has made a half-revolution. On the next swing of the pendulum the hook $K^2$ of the lever K catches the pin $G^2$ on the tumbler and pulls the latter over, reversing the current in the coil A' and driving the index-train by means of the pawl F' in the reverse direction; but as the pendulum is now retarded in proportion to the series current passing through the meter the index-train will be brought back, so that at the end of this second period of five minutes it will show the exact amount of current or energy passed through the meter during the ten minutes, and so on.

I have described my invention only as applied in one modification, and I would have it understood that I do not limit myself to the detail arrangements shown on the drawings. My invention consists generally in a one-pendulum meter capable of registering current or energy accurately and in such a manner as to be independent of the natural period of vibration of the pendulum and of the usual slow changes in that period.

The period of vibration of the pendulum need not be constant provided the changes in the period are not rapid in relation to the reversal period chosen.

Having now described my invention, what I claim as new, and desire to secure by Letters Patent, is—

1. An electric meter comprising a pendulum, a shunt-coil carried thereby, a series coil coacting with said shunt-coil, a recording-wheel train, reversible connections from said pendulum for operating said train, and means for automatically reversing said connections at determined intervals, substantially as described.

2. An electric meter comprising a pendulum, a shunt-coil carried thereby, a series coil coacting with said shunt-coil, a recording-wheel train, reversible connections from said pendulum for operating said train, and means for automatically reversing said connections at determined intervals, and for controlling the current in said shunt-coil, substantially as described.

3. An electric meter comprising a pendulum, a shunt-coil carried thereby, a series coil coacting therewith, a recording-wheel train, reversible pawl-and-ratchet mechanism connecting said pendulum and counting-wheel train, a current converter or reverser in said shunt-circuit, and means for simultaneously reversing said pawl-and-ratchet connections and operating said reverser, substantially as described.

In witness whereof I have hereunto set my hand in presence of two witnesses.

GEORGE HOOKHAM.

Witnesses:
H. BALL,
I. BROWN.